United States Patent [19]

Combest et al.

[11] 3,841,489

[45] Oct. 15, 1974

[54] FLUID FILTER

[75] Inventors: John F. Combest; Ralph L. Kuss, both of Findlay, Ohio

[73] Assignee: R. L. Kuss and Co., Inc., Findlay, Ohio

[22] Filed: May 2, 1973

[21] Appl. No.: 356,301

[52] U.S. Cl. .............................. 210/223, 210/448
[51] Int. Cl. ........................................ B01d 35/06
[58] Field of Search ............ 210/222, 223, 299–306, 210/448

[56] References Cited
UNITED STATES PATENTS

| | | | |
|---|---|---|---|
| 1,463,006 | 7/1923 | Dardani | 210/448 X |
| 2,784,843 | 3/1957 | Braunlich | 210/223 X |
| 2,926,787 | 3/1960 | Combest | 210/223 |
| 3,106,527 | 10/1963 | Korte et al. | 210/223 |
| 3,171,806 | 3/1965 | Schaffner | 210/223 X |
| 3,202,287 | 8/1965 | Szwargulski et al. | 210/448 X |
| 3,310,173 | 3/1967 | Sosower | 210/448 X |
| 3,347,386 | 10/1967 | Kraissl, Jr. | 210/223 X |

*Primary Examiner*—Samih N. Zaharna
*Assistant Examiner*—Richard W. Burks
*Attorney, Agent, or Firm*—Owen & Owen

[57] ABSTRACT

The invention is a fluid filter for use in a fuel line such as in an automobile. In its various embodiments, the filter employs a magnet which intercepts magnetic particles from the flowing fluid and a nylon mesh which screens out remaining foreign particles. In one embodiment, the magnet is an elongated ferrite loaded nylon shape with a cone-shaped deflector nose and a tapered downstream portion which extends into the cylinder defined by the nylon mesh. The magnet is snapped into place in the upstream end of an integrally molded nylon body which includes the nylon mesh. In another embodiment, the magnet is a compression-molded phenolic-ferritic snap-in disc with cone-shaped deflector nose positioned at the upstream end of a similar nylon body. A third embodiment employs a ceramic disc magnet retained in the upstream end of a nylon body substantially similar to that of the first two embodiments. In a fourth embodiment the magnet is riveted to the upstream end of the nylon body. In all embodiments, a raised dam-like rim may be provided at the base of the magnet's nose to prevent the washing away of particles which have been attracted to the magnet.

31 Claims, 15 Drawing Figures

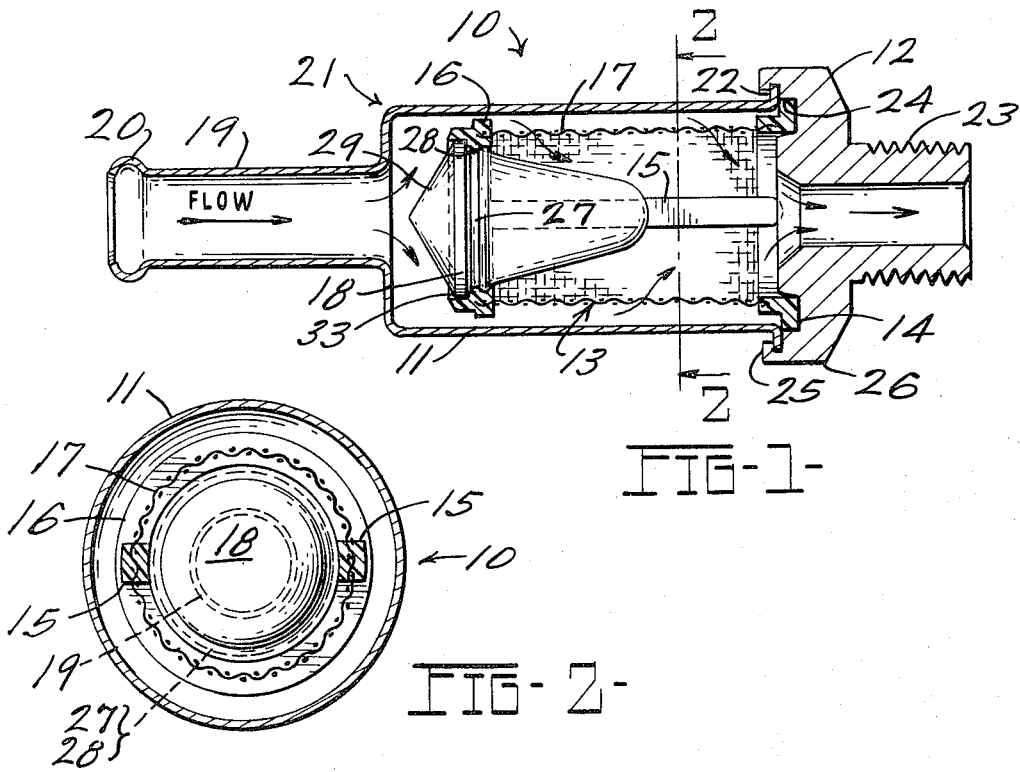
FIG-1-
FIG-2-
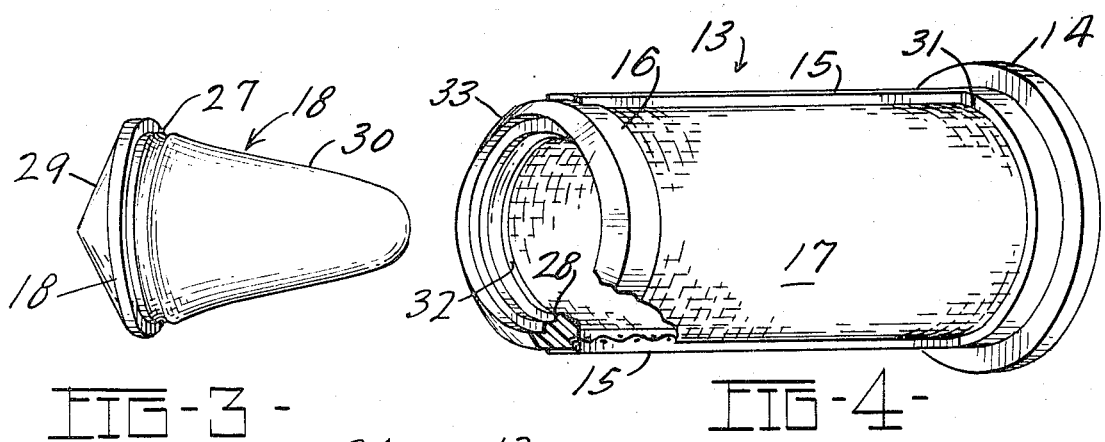
FIG-3-   FIG-4-
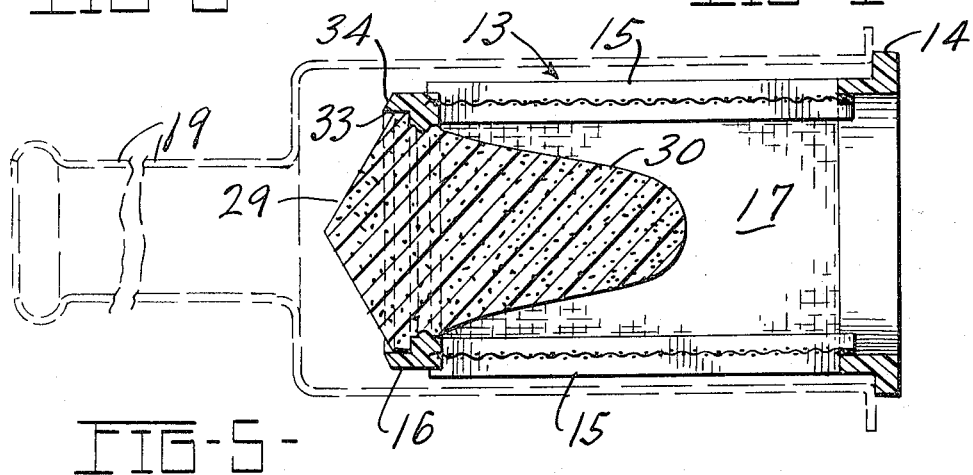
FIG-5-

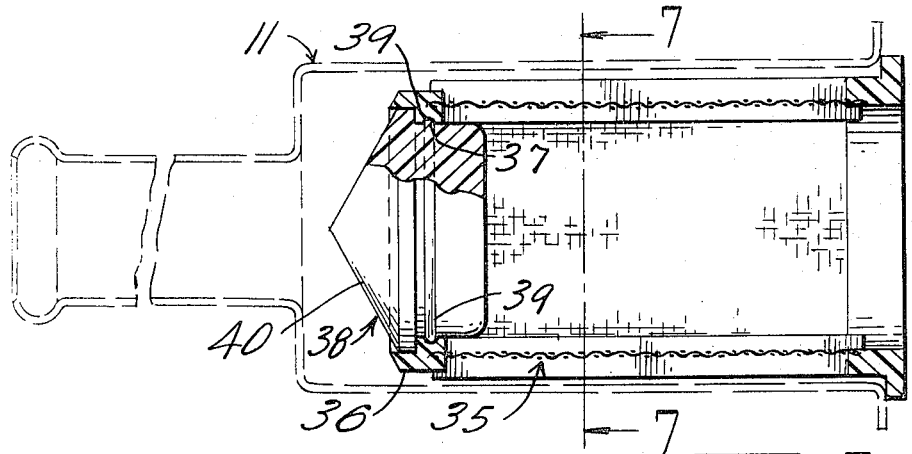
FIG-6-
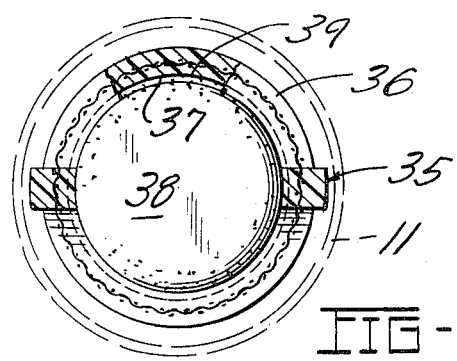
FIG-7-
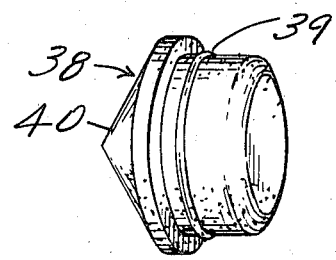
FIG-8-
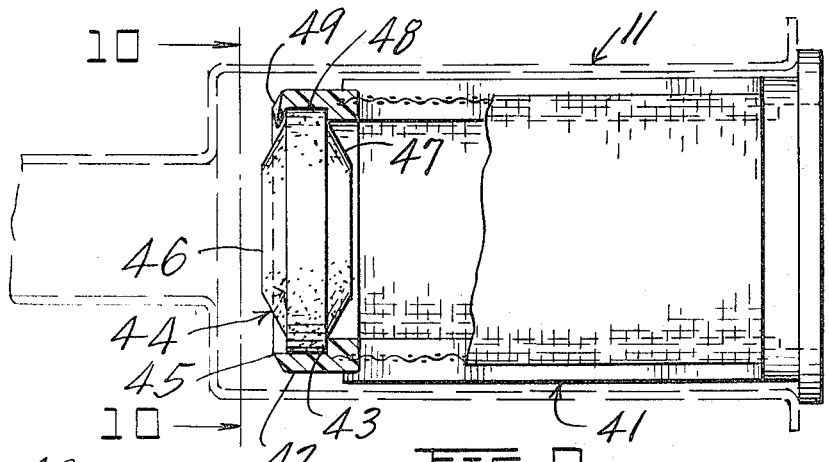
FIG-9-
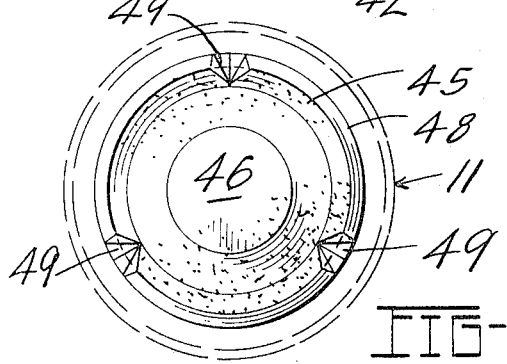
FIG-10-
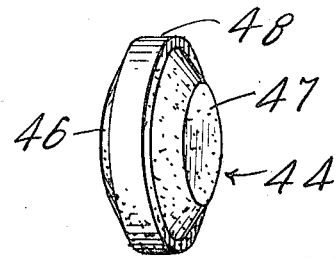
FIG-11-

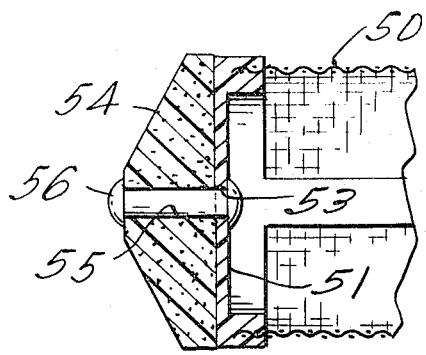
FIG-12-
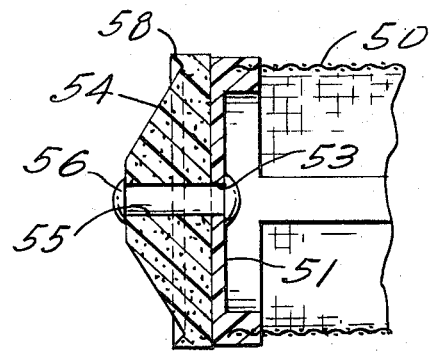
FIG-13-
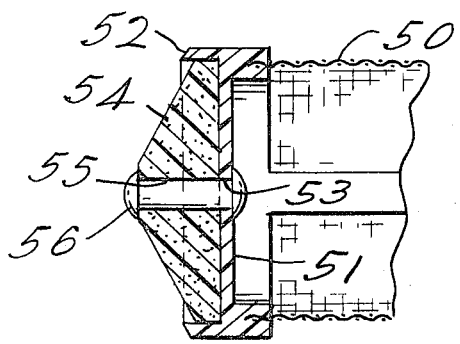
FIG-14-
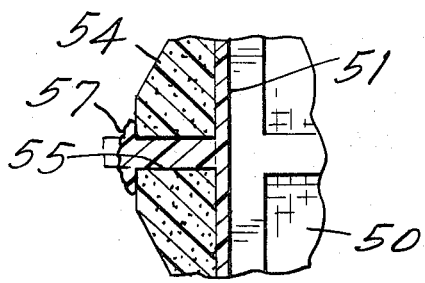
FIG-15-

FLUID FILTER

BACKGROUND OF THE INVENTION

Filters for automotive fuel systems are generally provided with a fine mesh screen for removing foreign particles from fuel prior to its introduction into a carburetor.

Automobile carburetors are often provided with an entrance valve comprising a metallic needle and seat. Repeated opening and closing of the entrance valve effects a slight magnetization of the needle and seat. Consequently, magnetic particles present in the fuel are attracted to the entrance valve assembly, resulting in a jamming of the valve and improper function of the carburetor. The present invention provides an in-line filter having a magnetic filter and a second nylon mesh filter. The present filter tends to prevent this jamming of the carburetor entrance valve and other difficulties caused by the introduction of foreign matter into the carburetor.

Filters having magnetic elements have previously been used for filtering magnetic particles from the gasolene supplied to internal combustion engines. However, many prior art magnetic fuel filters have included a settling bowl which must be oriented in a predetermined way upon the fuel pump or carburetor. The instant invention provides an in-line magnetic and mesh filter which can be positioned anywhere in an automobile fuel line between the fuel pump and the carburetor and which can be oriented either vertically, horizontally, or obliquely.

The present invention also provides a rugged and vibration-resistant filter which is economical to manufacture. This is accomplished primarily by an integrally molded nylon body which includes a filtering mesh, tightly retains a magnetic filter at its upstream end, and in turn is itself tightly retained within a casing which provides means for connection to the fuel line on each end.

SUMMARY OF THE INVENTION

The instant filter may be made in several different embodiments, each of which provides an effective in-line filter with a strong magnet. In addition the filter is simple and inexpensive to manufacture.

One embodiment of the filter employs a magnetic filter of nylon "loaded" with barium ferrite. This magnet has a conically-shaped nose for efficiently deflecting the incoming fluid radially outwardly toward the nylon mesh and thus tending to reduce the drop in fluid pressure as the fluid passes through the filter. The magnet includes an elongate tail portion, for several reasons. The length enables this magnet, which must be limited in its content of ferrite, to obtain a high degree of magnetization. Also, the tail portion substantially decreases the fluid volume of the filter within the enclosure defined by the nylon mesh. The result is that pressure loss through the filter tends to be reduced, and the possibility of vapor lock within the filter also tends to be reduced. In this embodiment, the magnet snaps into a seat in the cylindrical nylon body containing the mesh. The seat preferably provides a small dam around the outer perimeter of the magnet's nose to prevent the washing away of the trapped magnetic particles. The tight retention of the magnet by the seat tends to eliminate potential problems caused by the vibration of the fluid filter, for example, in an automobile fuel line.

In a second embodiment, the filter employs a magnet with a similar conically-shaped nose but no elongate tail portion. This magnet is preferably compression-molded from a phenolic material containing a relatively large loading of barium ferrite, resulting in a strong magnet. Again the seat for the magnet may provide a small dam around the base of the magnet's nose.

Another embodiment employs the magnet as a ceramic disc having identical faces to simplify its manufacture and its assembly into the nylon body. Each face is of the same generally truncated conical shape which renders the magnet nondirectional in assembly and aids its dispersal of the incoming fluid. The magnet is crimped or staked within a seat in the nylon body. As in the other embodiments, the seat preferably provides a small dam for the fluid at the outer periphery of the magnet.

In still another embodiment the magnet, which may be metallic, ceramic, or molded from a mixture including a ferrite, is riveted to the upstream end of the nylon body, preferably through its center. The rivet may be integrally molded with the nylon body or assembled as an independent rivet of metal, plastic, or nylon, for example.

In the four embodiments described, the integrally molded nylon body which retains the nylon mesh includes a circular gasket flange at its downstream end. Upon assembly of the fluid filter, this flange is tightly crimped between the casing and the outlet end, thus providing a rigid support for both filtering elements within the case. This feature, together with the integrally molded nylon body and tightly retained magnetic filter, greatly simplifies the manufacture of an effective in-line fuel filter and provides a filter that will better withstand vibration and have a longer effective life.

The above as well as other objects and advantages of the invention will become apparent from the following description, taken in conjunction with the accompanying drawings.

BRIEF DESCRIPTION OF THE DRAWINGS

FIG. 1 is a partially sectioned plan view of an assembled fluid filter embodying the instant invention;

FIG. 2 is a cross-sectional view of the filter taken along the line 2—2 of FIG. 1;

FIG. 3 is a perspective view of an elongated magnetic filter according to the instant invention;

FIG. 4 is a partially sectioned perspective view of an integrally-molded nylon body according to the instant invention;

FIG. 5 is a sectioned diagrammatic elevational view indicating the magnetic filter snapped into the nylon body and the general position of the nylon body in the casing;

FIG. 6 is a partially sectioned diagrammatic view of another fluid filter embodying the invention, with its outlet end removed;

FIG. 7 is a cross-sectional view of an integrally-molded nylon body and magnetic filter taken along the line 7—7 of FIG. 6, with a casing schematically indicated;

FIG. 8 is a perspective view of a magnetic filter according to the instant invention;

FIG. 9 is a partially sectioned diagrammatic view of still another fluid filter embodying the invention, with its outlet end removed;

FIG. 10 is a cross-sectional view of the filter indicating a magnetic filter retained by an integrally molded body;

FIG. 11 is a perspective view of a disc-like magnetic filter according to the instant invention, FIG. 12 is a sectional plan view of a portion of an integrally molded nylon body with a magnetic filter retained to the body by riveting; and FIGS. 13, 14, and 15 are sectional plan views of the same portion of the nylon body with variations in the nylon body and the magnetic filter.

DESCRIPTION OF THE PREFERRED EMBODIMENT

A fluid filter embodying the present invention is generally indicated in FIGS. 1 and 2 by the reference number 10. The filter 10 includes a tubular or cylindrical casing 11. The casing 11 is generally metallic and is crimped or otherwise sealingly attached to an outlet end 12. Within the filter 10 is an integrally molded nylon body generally indicated by the reference number 13. The nylon body 13 includes a gasket flange 14, frame members 15, a seat 16, and a nylon mesh 17 of predetermined opening size, which serves as the peripheral wall of the nylon body 13. The seat 16 retains a snap-in elongate magnet 18.

Referring again to FIGS. 1 and 2, the casing 11 is preferably of stamped metal, cylindrical in shape, and has an inlet fitting 19 also of generally cylindrical shape. The casing 11 and the fitting 19 are preferably manufactured in one piece. At the upstream end of the inlet fitting 19 is an enlarged end portion 20, enabling the fitting to be connected to a flexible line of a fluid transmission system, such as an automobile fuel line. A shoulder portion 21 of the casing 11 is slightly rounded for increased strength. The downstream end of the casing 11 is formed into a flared rim 22 for intimate connection with the casing's outlet end 12.

Referring again to FIG. 1, the outlet end 12 of the filter 10 is a metal structure having a threaded outlet fitting 23 for connection into a portion of a fluid transmission system, such as an automobile carburetor. The outlet end 12 has a recessed portion 24 adapted to fit tightly over the gasket flange 14 of the nylon body 13. Exterior to the recessed portion 24 is an outer rim 25 which upon assembly is crimped tightly over the flared rim 22 of the casing 11 as shown in FIG. 1. This results in a rigid retention of the entire nylon body within the filter 10. An outer surface 26 of the outlet end 12 is hexagonal so that conventional tools can be used to tighten the assembled fluid filter into a fluid transmission system.

Referring now to FIGS. 3 and 4, the elongated magnet 18 is preferably molded from a mixture of nylon and a ferrite, preferably barium ferrite. It has been found that the nylon can effectively retain only a limited quantity of barium ferrite, generally not greatly exceeding about fifty percent of the total volume of the magnet. The length of the magnet 18 compensates for this limited ferrite content so that a high strength magnet with opposite polarity on opposite ends is obtainable. The magnet 18 has a peripheral groove 27, and corresponding to this groove 27 is an inner rim 28 on the seat 16 of the nylon body 13. The groove 27 and rim 28 are positioned such that the elongated magnet 18 snaps snugly into the nylon body 13. The groove and rim positions may of course be reversed so that the groove resides in the seat 16 and the rim is included on the magnet 18. Also included in the magnet 18 are a conically shaped nose portion 29 and an elongated tail portion 30.

As illustrated in FIGS. 4 and 5, the integrally molded nylon body 13 includes and cylindrically retains the nylon mesh 17 of predetermined opening size. Preferably the mesh 17 is capture molded to the base 31 of the gasket flange 14; to the frame members 15; and to the base 32 of the seat 16. The frame members 15 are integrally molded to the base 31 of the gasket flange 14 and to the base 32 of the seat 16, thus defining a rigid frame structure.

An upstream-extending projection 33 is included in the seat 16 of the nylon body 13, as shown in FIGS. 4 and 5. In the assembled filter 10, this projection forms a small dam or slack area for the fluid as it passes over the conically shaped nose 29 of the magnet 18. This tends to prevent the washing away of the magnetic particles once they have been attracted to the magnet 18. The projection 33 is tapered to form a surface 34 generally parallel to the nose portion 29, so that fluid velocity loss and pressure loss over the projection are kept at a minimum.

A second embodiment of a fluid filter according to the present invention is indicated in FIGS. 6, 7, and 8. In this embodiment the casing 11 and outlet end 12 are identical to those of the first embodiment. An integrally molded nylon body generally indicated by the reference number 35 is also identical to the nylon body 13 of the first embodiment, except that the seat 36 of this embodiment includes an inner groove 37 rather than the inner rim 28 of seat 16 of the first embodiment. The seat 36 is otherwise identical to the seat 16.

A magnetic filter generally indicated by the reference number 38 includes a peripheral rim 39 corresponding to the inner groove 37 of the seat 36. This rim 39 and groove 37 are positioned such that the magnetic filter 38 snaps snugly into the nylon body 35. The rim and groove may of course be reversed if desired. Also included in the magnetic filter 38 is a conically shaped nose portion 40.

The magnet 38 is preferably compression molded from a phenolic material containing ferrite particles, preferably barium ferrite. This composition enables the magnet 38 to contain a high concentration of ferrite, resulting in a strong magnet. It has been found that an efficient magnet of up to about ninety percent by volume barium ferrite can be obtained with compression molding.

A third embodiment of the present invention is illustrated in FIGS. 9, 10, and 11. In this embodiment the casing 11 and outlet end 12 are again identical to those of the first embodiment. An integrally molded nylon body is generally indicated by the reference number 41. This nylon body 41 is similar to the nylon body 13 of the first embodiment, but the seat 42 is different from the seat 16. The seat 42 includes a shelf 43 for a magnetic filter 44 and an upstream-extending projection 45.

The magnetic filter 44 is preferably of a ceramic material and is generally disc-shaped. Its two opposed faces 46 and 47 are identical but preferably have opposite polarities. Each is generally the shape of a truncated cone situated on a flat circular plane. Thus, the faces 46 and 47 are interchangeable, rendering the magnet 44 nondirectional on assembly. An outer rim portion 48 of the magnet 44 fits snugly within the seat 42. The seat 42 is preferably crimped or stacked over the magnet 44 at several crimp points 49 or around the entire periphery of the seat 42, thus tightly retaining the magnet 44 in the nylon body 41.

FIGS. 12, 13, 14 and 15 illustrate a fourth embodiment of the invention. Again, the casing 11 and outlet end 12 are identical to those of the first embodiment. An integrally molded nylon body 50 is similar to the nylon body 13 of the first embodiment except that a structural member 51, which may comprise an end wall or merely several ribs, is integrally molded in the upstream end of the nylon body 50. The nylon body 50 may include an upstream extending rim 52 as shown in FIG. 14, to provide a damming means.

The structural members 51 may include a hole 53 preferably through the longitudinal axis of the nylon body 50, as shown in FIGS. 12, 13 and 14. A magnetic filter 54 with a corresponding hole 55 is tightly retained on the nylon body 50 by means of a rivet 56, which may be of any suitable material. Alternatively, a nylon rivet 57 may be integrally molded with the nylon body 50 and its structural member 51, as shown in FIG. 15.

The magnetic filter 54 is generally the shape of a truncated cone and may be metallic, ceramic, or molded from a mixture including a ferrite. It may be employed in conjunction with the upstream-extending rim 52 of FIG. 14 or otherwise. In absence of this rim 52, the magnet 54 may extend to the outer periphery of the nylon body 50 as shown in FIG. 12, or it may include a damming rim 58 as shown in FIG. 13.

The flow of fluid through the assembled filter 10 of the first embodiment, for example, is illustrated in FIG. 1. From a fluid supply such as a fuel line downstream of a fuel pump, fluid enters the inlet fitting 19 of the casing 11 of the filter 10 and loses magnetic particles it may be carrying as it is deflected and dispersed radially outwardly by the conically shaped nose portion 29 of the elongate magnetic filter 18. The projection 33 of the seat 16 provides a trap or dam for magnetic particles which might otherwise wash away. After passing around the perimeter of the seat 16, the fluid passes through the nylon filtering mesh 17 and into the nylon body 13, where it tends to lose any remaining metallic particles to the elongate tail portion 30 of the magnetic filter 18. From here the fluid flows through the open gasket flange 14 and into the threaded outlet fitting 23, from which it enters the fuel line or carburetor virtually devoid of foreign particles.

It will be seen that the above described preferred embodiments provide in-line filters capable of removing unwanted particles by both magnetic and filter screen separation, the filters being rugged and vibration resistant and economical to manufacture. Various other embodiments and changes to the preferred embodiments described above will be apparent to those skilled in the art and may be made without departing from the spirit and scope of the following claims.

We claim:

1. A fluid filter comprising a case, said case defining an upstream inlet fitting and a downstream outlet fitting, first filtering means within said case for capturing foreign magnetic particles within a flowing fluid in the line, second filtering means for capturing other foreign particles within the fluid, means integral with said first filtering means for deflecting the fluid from an axial path through said inlet radially outwardly toward said second filtering means, and structural means for retaining said first and second filtering means together within said case.

2. A fluid filter as described in claim 1 wherein said first filtering means comprises a molded magnet of nylon and a ferritic material.

3. A fluid filter as described in claim 1 wherein said structural means comprises a seat for supporting said first filtering means, a gasket flange tightly crimped within said case, and frame members connected to said seat and said flange and supporting said second filtering means.

4. A fluid filter as described in claim 3 wherein said seat includes means for preventing the washing away of the filtered magnetic particles from said first filtering means.

5. A fluid filter as described in claim 3 wherein said seat, said frame members, said gasket flange and said second filtering means define an integrally molded nylon body of generally cylindrical shape.

6. A fluid filter as described in claim 2 wherein said magnet comprises a nose portion and an elongate tail portion.

7. A fluid filter as described in claim 5 wherein said first filtering means comprises a nose portion and an elongate tail portion extending into said nylon body and substantially reducing the fluid capacity of said fluid filter downstream of said second filtering means.

8. A fluid filter as described in claim 7 wherein said nose portion is conically shaped.

9. A fluid filter as described in claim 7 wherein said second filtering means comprises a nylon mesh of predetermined opening size.

10. A fluid filter as described in claim 7 wherein said first filtering means comprises a magnet having opposite polarity on said nose and tail portions.

11. A fluid filter as described in claim 7 wherein said first filtering means and said seat include means for removably retaining said first filtering means within said seat.

12. A fluid filter according to claim 1 wherein said first filtering means comprises a disc magnet of phenolic material containing ferritic particles.

13. A fluid filter according to claim 12 wherein said structural means comprises a seat for said magnet, a gasket flange, and frame members connected to said gasket flange and said seat.

14. A fluid filter according to claim 13 which further includes means for removably retaining said magnet within said seat.

15. A fluid filter according to claim 13 wherein said second filtering means comprises a nylon mesh of predetermined mesh opening size and said mesh, seat, frame members and gasket flange are integrally molded together.

16. A fluid filter according to claim 13 wherein said seat extends slightly upstream of the outer periphery of said magnet.

17. A fluid filter according to claim 1 wherein said first filtering means comprises a generally disc-shaped magnet.

18. A fluid filter according to claim 17 wherein said second filtering means comprises a nylon mesh of predetermined mesh opening size.

19. A fluid filter according to claim 17 wherein said structural means comprises a seat for said magnet, frame members connected to said seat and supporting said mesh, and a gasket flange connected to said frame members and said mesh.

20. A fluid filter according to claim 19 wherein said seat extends slightly upstream of the outer periphery of said magnet.

21. A fluid filter according to claim 17 wherein said magnet is of a ceramic material and has two opposed faces which are identical.

22. A fluid filter according to claim 19 wherein said gasket flange is tightly retained within said case.

23. A fluid filter according to claim 19 wherein said magnet is riveted to said seat.

24. A fluid filter according to claim 20 wherein said magnet is riveted to said seat.

25. A fluid filter according to claim 24 wherein said magnet is generally of a truncated conical shape.

26. A fluid filter according to claim 19 wherein said magnet has an axial bore therethrough and said seat includes a transverse end portion and an axial projection, whereby said axial projection extends through said axial bore to retain said magnet on said seat.

27. A fluid filter according to claim 17 wherein said magnet is generally of a truncated conical shape with a fluid damming rim at its outer periphery.

28. A fluid filter comprising an elongate case including a pair of opposed fittings providing fluid openings therethrough;

a first magnetic filtering means within said case adjacent one of said fittings for capturing foreign magnetic particles within the flowing fluid and deflecting the fluid radially outwardly within said case, a filtering mesh adjacent said first magnetic filtering means for capturing other foreign particles within the fluid, a second magnetic filtering means downstream of said mesh for capturing remaining magnetic particles within the fluid and for limiting the fluid volume of said case, and a gasket flange connected to said mesh in opposed relationship to said first magnetic filtering means and tightly retained within said case.

29. A fluid filter according to claim 28 wherein said first and second magnetic filtering means comprise an integrally molded magnet of nylon and a ferritic material.

30. In a fluid filter including a filtering mesh, a magnetic filtering element having two identical faces but with opposite polarity, each said face being generally the shape of a truncated cone situated on a flat circular plane.

31. In a fluid filter including a filtering mesh, a magnetic filtering element according to claim 30 wherein said filtering element defines a first filtering means of said fluid filter, and peripherally adjacent to and downstream from said filtering element is a damming means whereby magnetic foreign particles attracted to said filtering element are retained by said damming means and prevented from reaching said filtering mesh.

* * * * *